US012337490B2

(12) United States Patent
Yeh et al.

(10) Patent No.: US 12,337,490 B2
(45) Date of Patent: Jun. 24, 2025

(54) KNIFE HOLDER

(71) Applicants: Patrick Yeh, New Taipei (TW); Tzu-Shuo Yeh, New Taipei (TW)

(72) Inventors: Patrick Yeh, New Taipei (TW); Tzu-Shuo Yeh, New Taipei (TW)

( * ) Notice: Subject to any disclaimer, the term of this patent is extended or adjusted under 35 U.S.C. 154(b) by 334 days.

(21) Appl. No.: 17/865,322

(22) Filed: Jul. 14, 2022

(65) Prior Publication Data

US 2024/0017430 A1 Jan. 18, 2024

(51) Int. Cl.
*B26B 1/08* (2006.01)

(52) U.S. Cl.
CPC .................................... *B26B 1/08* (2013.01)

(58) Field of Classification Search
CPC ....................................................... B26B 1/08
See application file for complete search history.

(56) References Cited

U.S. PATENT DOCUMENTS

| | | | | |
|---|---|---|---|---|
| 1,796,847 A * | 3/1931 | Leclerc | B26B 1/08 30/162 |
| 1,960,130 A * | 5/1934 | Trubel | B26B 1/08 30/162 |
| 2,640,260 A * | 6/1953 | Taylor | B26B 1/08 30/162 |
| 6,293,020 B1 | 9/2001 | Julien | |
| 11,999,070 B1 * | 6/2024 | Marfione | B26B 1/08 |
| 2008/0066318 A1 | 3/2008 | Ye | |
| 2014/0173912 A1 * | 6/2014 | Scimone | B26B 1/00 30/162 |
| 2021/0170611 A1 * | 6/2021 | Henn | B26B 5/003 |
| 2022/0001553 A1 | 1/2022 | Ellegala et al. | |
| 2023/0118410 A1 * | 4/2023 | Gallegos | B26B 5/001 30/162 |

FOREIGN PATENT DOCUMENTS

| | | |
|---|---|---|
| CN | 109937019 | 6/2019 |
| CN | 212123371 | 12/2020 |
| CN | 214265680 | 9/2021 |
| TW | M303804 | 1/2007 |
| TW | M403528 | 5/2011 |
| TW | I764684 | 5/2022 |

OTHER PUBLICATIONS

"Office Action of Taiwan Counterpart Application", issued on Apr. 28, 2023, p. 1-p. 8.

* cited by examiner

*Primary Examiner* — Omar Flores Sanchez
(74) *Attorney, Agent, or Firm* — JCIPRNET

(57) ABSTRACT

A knife holder adapted to be connected to a blade is provided. The knife holder includes a first and second handle. The first handle has a positioning portion formed on a first inner side surface of the first handle, and the blade is disposed on the first inner side surface of the first handle and adjustably engaged with the positioning portion. The second handle is detachably disposed on the first handle and has at least one accommodating groove formed on a second inner side surface of the second handle. The blade is clamped by the first handle and the second handle and the positioning portion is stored in the at least one accommodating groove. In the use state, the blade is partially protruded beyond the first handle and the second handle. In a storage state, the blade is completely concealed between the first handle and the second handle.

17 Claims, 6 Drawing Sheets

KNIFE HOLDER

BACKGROUND OF THE INVENTION

Field of the Invention

The invention relates to a knife holder, and more particularly, to a knife holder combined with a replaceable blade.

Description of Related Art

At present, there are two types of bread knives sold on the market: long-handled bread knives and round bread knives. For most replaceable blades, because the blades are extremely sharp, the blades need to be sheathed or separated from the handle for safety when not in use. However, the handle of the round bread knife has a round shape, and the user only holds the handle of the round bread knife with the thumb, index finger, and middle finger. The round bread knife is light and easy to handle, and suitable for precise cutting of fine textures of dough. However, since the handle of the round bread knife is round, the handle of the round bread knife is not conducive to the user's holding. When encountering a deep dough cutting process or when the dough is mixed with particles such as nuts, the stability of the hand is compromised due to the large resistance generated by the dough or particles. If the blade is not securely fixed, there may be safety concerns about sliding. Long-handled bread knives have a long handle, which has the advantage of providing better grip when making a large number of simple-textured dough cuts or deeper dough cuts. However, the disadvantage is that the long handle is not as easy to handle as a round bread knife, and is not adapted for precise cutting of a large number of fine dough textures. Moreover, for most round bread knives and some long-handled bread knives, screws are used as parts to fix the blade, and some models require a screwdriver or a wrench tool when loading and unloading the blade. The process is not only cumbersome and time-consuming, but there is also the safety concern that moving parts such as the screws are loosened and mixed into the flour or dough.

SUMMARY OF THE INVENTION

The invention provides a knife holder with easy loading and unloading of blades and no movable parts, is adapted to be combined with a blade, and compared with the replaceable knives in the prior art, convenience and safety of use may be improved.

A knife holder of the invention is adapted to be connected to a blade. The knife holder includes a first handle and a second handle. The first handle has a positioning portion, the positioning portion is formed on a first inner side surface of the first handle, and the blade is disposed on the first inner side surface of the first handle and adjustably engaged with the positioning portion. The second handle is detachably disposed on the first handle and has at least one accommodating groove, and the at least one accommodating groove is formed on a second inner side surface of the second handle. The blade is clamped by the first handle and the second handle and the positioning portion is stored in the at least one accommodating groove. In the use state, the blade is partially protruded beyond the first handle and the second handle. In a storage state, the blade is completely concealed between the first handle and the second handle.

In an embodiment of the invention, the positioning portion has a first bump, a second bump, a third bump, and a fourth bump, and a first positioning groove is located between the first bump and the second bump, a second positioning groove is located between the second bump and the third bump, and a third positioning groove is located between the third bump and the fourth bump.

In an embodiment of the invention, the at least one accommodating groove is a long groove and accommodates the first bump, the second bump, the third bump, and the fourth bump.

In an embodiment of the invention, a number of the at least one accommodating groove includes a plurality, and the at least one accommodating groove accommodates the first bump, the second bump, the third bump, and the fourth bump respectively.

In an embodiment of the invention, the blade has a first end portion, a second end portion, and a long hole, and the long hole penetrates the blade and is located between the first end portion and the second end portion.

In an embodiment of the invention, in the use state, the first end portion of the blade is protruded beyond the first handle and the second handle, the second end portion is engaged with one of the first positioning groove, the second positioning groove, and the third positioning groove, and the long hole accommodates at least the first bump, and in the storage state, the first end portion of the blade is engaged with the first positioning groove, the second end portion is located outside the fourth bump, and the long hole accommodates the second bump, the third bump, and the fourth bump.

In an embodiment of the invention, the first handle has a wrenching groove formed on the first inner side surface, and the second end portion of the blade is suspended on the wrenching groove in the storage state.

In an embodiment of the invention, the first handle has at least one first magnetic member, the second handle has at least one second magnetic member, and the at least one first magnetic member and the at least one second magnetic member are attracted to each other to clamp the blade.

In an embodiment of the invention, the at least one first magnetic member is disposed on the first inner side surface, and the at least one second magnetic member is disposed on the second inner side surface and corresponds to the at least one first magnetic member.

In an embodiment of the invention, the at least one first magnetic member is embedded in the first handle, and the at least one second magnetic member is embedded in the second handle and corresponds to the at least one first magnetic member.

In an embodiment of the invention, the at least one first magnetic member and the at least one second magnetic member are both magnets, or one of the at least one first magnetic member and the at least one second magnetic member is a magnet and the other is a ferromagnetic metal.

In an embodiment of the invention, the positioning portion has a positioning bump formed by a circular portion and two rectangular portions, and the two rectangular portions are respectively formed on two opposite sides of the circular portion.

In an embodiment of the invention, the at least one accommodating groove accommodates the positioning bump.

In an embodiment of the invention, the blade has a first end portion, a second end portion, a first engaging hole, a second engaging hole, and a third engaging hole, and the first engaging hole, the second engaging hole, and the third engaging hole penetrate the blade and are located between the first end portion and the second end portion.

In an embodiment of the invention, in the use state, the first end portion of the blade is protruded beyond the first handle and the second handle, and the second engaging hole or the third engaging hole accommodates the positioning bump, and in the storage state, the first end portion and the second end portion of the blade are overlapped with the first handle and the second handle, and the first engaging hole accommodates the positioning bump.

In an embodiment of the invention, the first handle and the second handle are long structures.

In an embodiment of the invention, a hinge module is further included and disposed between the first handle and the second handle, and the first handle and the second handle are adapted to be rotated along an axis to be expanded or closed with each other.

In an embodiment of the invention, a connecting sheet is further included and disposed between the first handle and the second handle, and the first handle and the second handle are adapted to be expanded or closed with each other via the connecting sheet.

Based on the above, the knife holder of the invention is adapted to be combined with a replaceable blade, and in the use state, the first handle and the second handle clamp the blade and make the blade partially protrude beyond the first handle and the second handle. The user holds the first handle and the second handle and cuts with the blade. In the storage state, the blade is completely stored between the first handle and the second handle, so as to avoid the situation of exposing the blade and cutting the fingers.

DESCRIPTION OF THE EMBODIMENTS

Figure 1A:
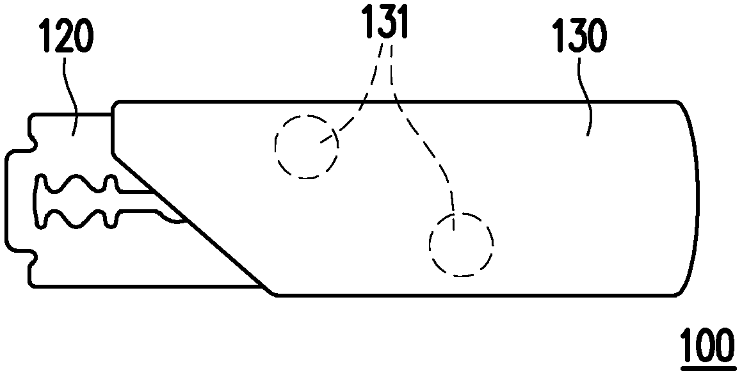
FIG. 1A is a schematic diagram of the use state of a knife holder according to an embodiment of the invention.
Figure 1B:
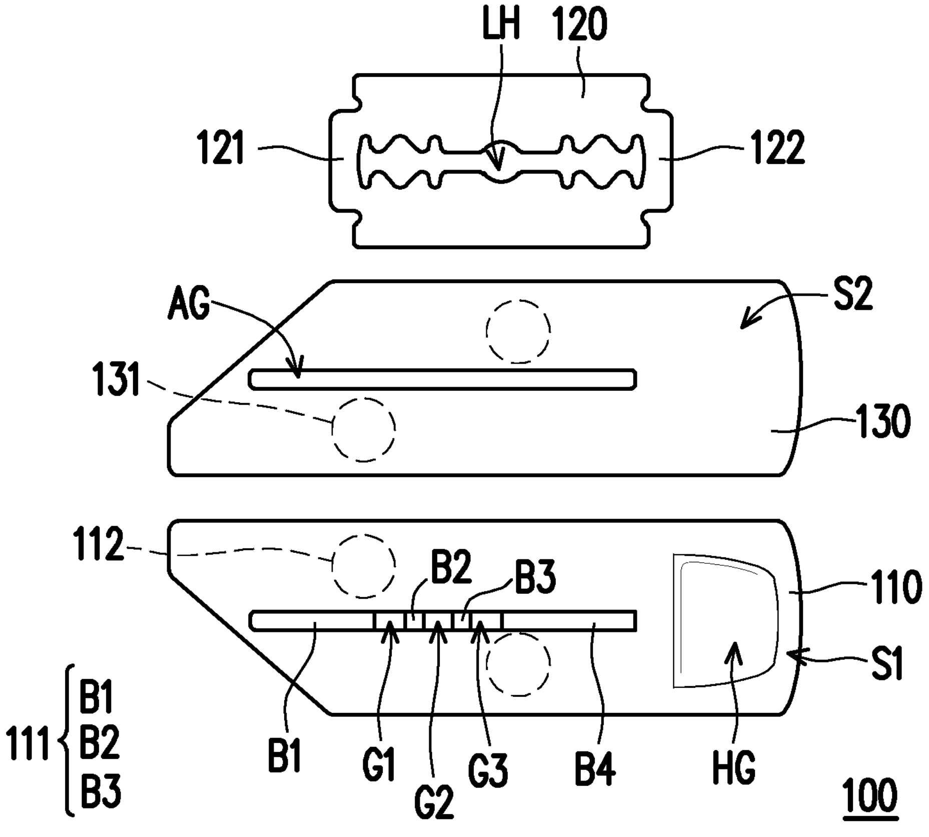
FIG. 1B is an element exploded schematic view of the knife holder of FIG. 1A.
Figure 1C:
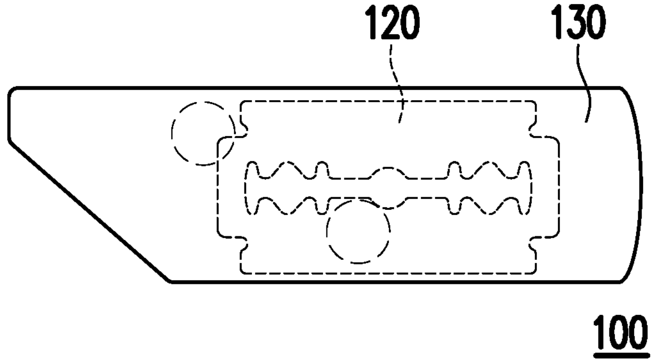
FIG. 1C is a schematic diagram of a storage state of the knife holder of FIG. 1A.
Figure 2A:
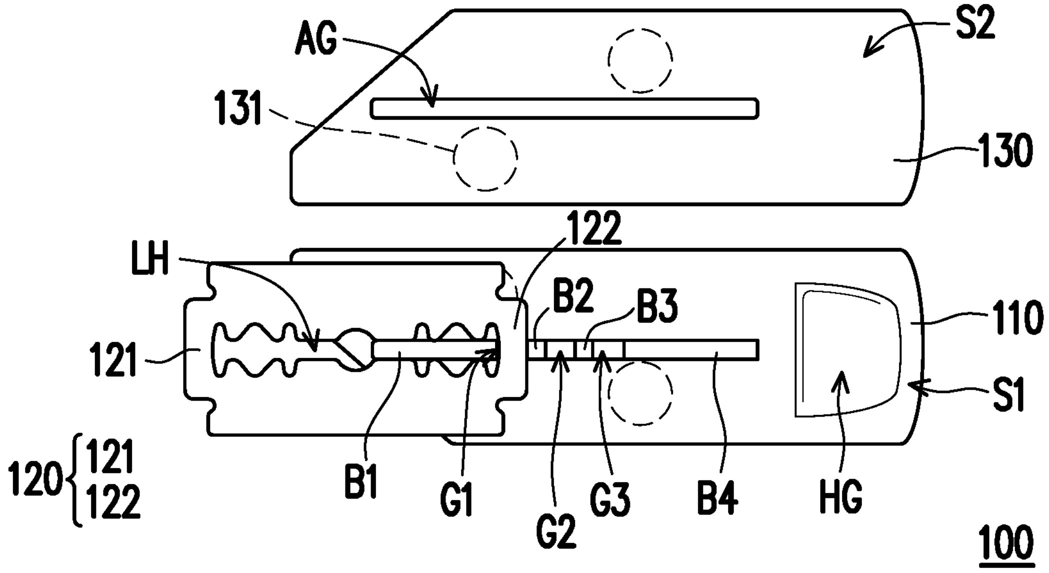
FIG. 2A is a schematic diagram of the engagement relationship between the first handle and the blade of FIG. 1A.
Figure 2B:
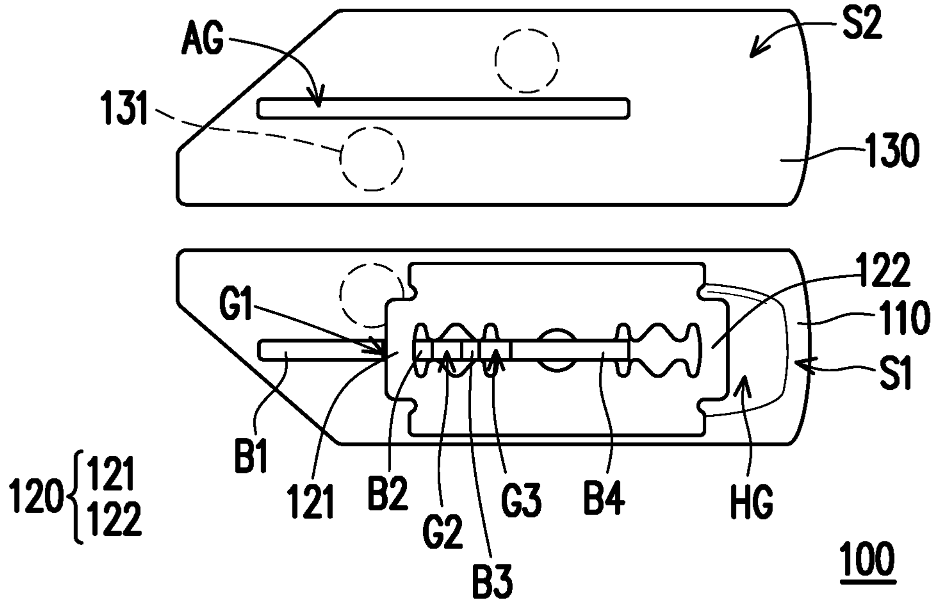
FIG. 2B is a schematic diagram of the engagement relationship between the first handle and the blade of FIG. 1C.

FIG. 1A is a schematic diagram of the use state of a knife holder according to an embodiment of the invention. FIG. 1B is an element exploded schematic view of the knife holder of FIG. 1A. FIG. 1C is a schematic diagram of a storage state of the knife holder of FIG. 1A. FIG. 2A is a schematic diagram of the engagement relationship between the first handle and the blade of FIG. 1A. FIG. 2B is a schematic diagram of the engagement relationship between the first handle and the blade of FIG. 1C.

Referring to FIG. 1A to FIG. 1C, a knife holder 100 of the invention is used for combining with a blade 120 to form a dough cutter for a baker to cut patterns on fermented dough, so that the dough produces patterns after baking to improve texture. The knife holder 100 includes a first handle 110 and a second handle 130.

The first handle 110 has a positioning portion 111, and the positioning portion 111 is formed on a first inner side surface S1 of the first handle 110. The blade 120 is disposed on the first inner side surface S1 of the first handle 110 and adjustably engaged with the positioning portion 111. In particular, the blade 120 and the first handle 110 are adapted to adjust the overlapping size of the two, so that the blade 120 may be engaged with different positions of the positioning portion 111. The second handle 130 is disposed on the first handle 110 and has an accommodating groove AG, and the accommodating groove AG is formed on a second inner side surface S2 of the second handle 130. The first handle 110 and the second handle 130 clamp two sides of the blade 120 and the positioning portion 111 is accommodated in the accommodating groove AG, thereby fixing the orientation of the blade 120. In the use state, the blade 120 is partially protruded beyond the first handle 110 and the second handle 130, and in the storage state, the blade 120 is completely located between the first handle 110 and the second handle 130.

In the present embodiment, the material of the first handle 110 and the second handle 130 is, for example, wood, metal, plastic, or a combination of the above materials.

Referring to FIG. 1A to FIG. 1C, the positioning portion 111 of the first handle 110 has a first bump B1, a second bump B2, a third bump B3, and a fourth bump B4. A first positioning groove G1 is located between the first bump B1 and the second bump B2, a second positioning groove G2 is located between the second bump B2 and the third bump B3, and a third positioning groove G3 is located between the third bump B3 and the fourth bump B4. Referring to FIG. 1B, the accommodating groove AG is a long groove and accommodates the first bump B1, the second bump B2, the third bump B3, and the fourth bump B4.

Figure 1D:
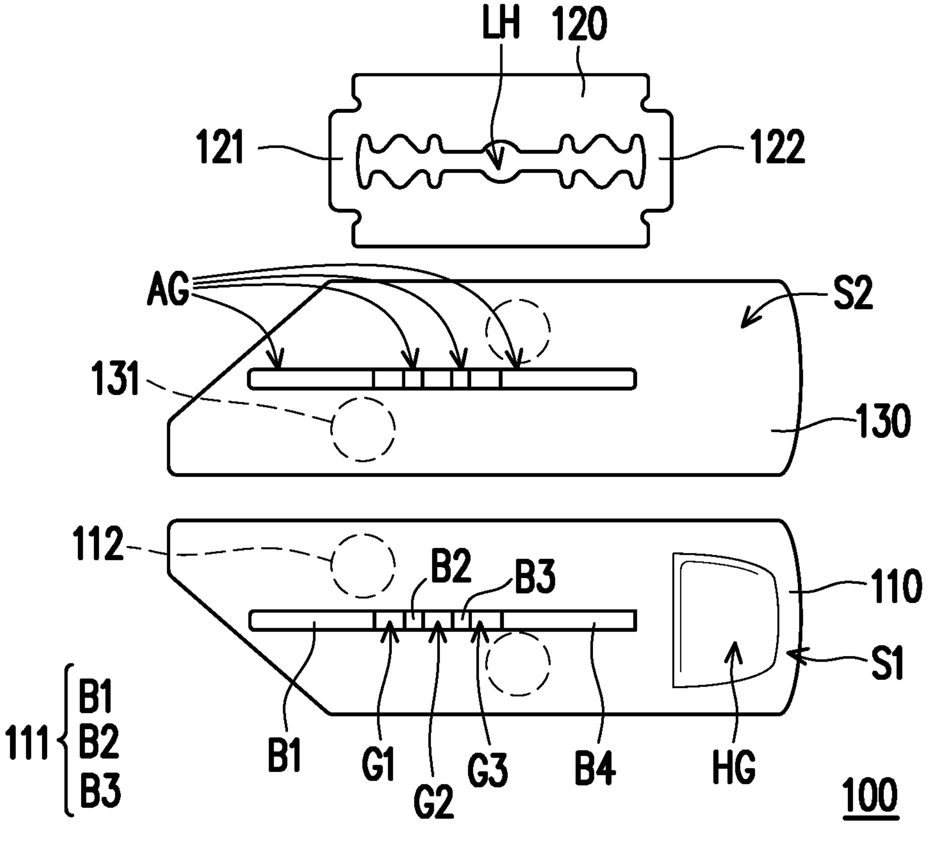
FIG. 1D is an element exploded schematic view of the second handle of another embodiment of the knife holder of FIG. 1A.

FIG. 1D is an element exploded schematic view of the second handle of another embodiment of the knife holder of FIG. 1A.

Referring to FIG. 1D, in another embodiment of the invention, the second handle 130 has a plurality of accommodating grooves AG and respectively accommodates the first bump B1, the second bump B2, the third bump B3, and the fourth bump B4.

The blade 120 has a first end portion 121, a second end portion 122, and a long hole LH. The long hole LH penetrates the blade 120 and is located between the first end portion 121 and the second end portion 122. In short, one of the bumps (B1, B2, B3, B4) of the positioning portion 111 passes through the long hole LH of the blade 120 and is positioned in the accommodating groove AG, thereby engaging the blade 120 with the positioning portion 111. Referring to FIG. 1A and FIG. 2A, in the use state, the first end portion 121 of the blade 120 is protruded beyond the first handle 110 and the second handle 130, and the second end portion 122 is engaged with one of the first positioning groove G1, the second positioning groove G2, and the third positioning groove G3. In detail, when the second end portion 122 is engaged with the first positioning groove G1, the long hole LH accommodates the first bump B1. When the second end portion 122 is engaged with the second positioning groove G2, the long hole LH accommodates the first bump B1 and the second bump B2. When the second end portion 122 is engaged with the third positioning groove G3, the long hole LH accommodates the first bump B1, the second bump B2, and the third bump B3. Thereby, the length of the blade 120 protruding beyond the first handle 110 and the second handle 130 is adjusted. Further, the inner edge of the long hole LH is abutted against the first bump B1, the second bump B2, or the third bump B3, so as to prevent the blade 120 from being shifted relative to the first handle 110.

Referring to FIG. 1C and FIG. 2B, in the storage state, the first end portion 121 of the blade 120 is engaged with the first positioning groove G1, the second end portion 122 is located outside the fourth bump B4, and the long hole LH accommodates the second bump B2, the third bump B3, and the fourth bump B4. Further, the inner edge of the long hole LH is abutted against the second bump B2, the third bump B3, or the fourth bump B4, so as to prevent the blade 120 from being shifted relative to the first handle 110.

Referring to FIG. 2B, the first handle 110 has a wrenching groove HG formed on the first inner side surface S1. In the storage state, the second end portion 122 of the blade 120 is suspended on the wrenching groove HG. In addition, the user may move the second end portion 122 of the blade 120 in the wrenching groove HG with a finger, so that the blade 120 is relatively far away from the inner side surface S1 of the first handle 110, which is convenient for replacing or adjusting the blade 120.

Referring to FIG. 1A to FIG. 1C, the first handle 110 has at least one first magnetic member 112, and the second handle 130 has at least one second magnetic member 131. When the first handle 110 and the second handle 130 are abutted against each other, the at least one first magnetic member 112 and the at least one second magnetic member 131 are magnetically attracted to each other to clamp the blade 120, so that the first handle 110 and the second handle 130 are not readily separated to cause the blade 120 to move or fall off.

In the present embodiment, the at least one first magnetic member 112 is disposed on the first inner side surface S1, and the at least one second magnetic member 131 is disposed on the second inner side surface S2 and corresponds to the at least one first magnetic member 112.

In the present embodiment, the at least one first magnetic member 112 and the at least one second magnetic member 131 are both magnets, or one of the at least one first magnetic member 112 and the at least one second magnetic member 131 is a magnet and the other is a ferromagnetic metal (iron, nickel, cobalt, and alloys thereof).

In another embodiment, the at least one first magnetic member is embedded in the first handle, and the at least one second magnetic member is embedded in the second handle and corresponds to the at least one first magnetic member.

Referring to FIG. 1A, FIG. 2A, and FIG. 1B, the knife holder 100 of the invention has the characteristics of easy disassembly and replacement. When the blade 120 is replaced or adjusted, the first handle 110 and the second handle 130 may be separated by applying force with both hands, and then the blade 120 may be removed from the first handle 110. After the replacement or adjustment of the blade 120 is completed, the first handle 110 and the second handle 130 only need to be made to abut against each other to make the first handle 110 and the second handle 130 closed with each other via the magnetic attraction of the at least one first magnetic member 112 and the at least one second magnetic member 131.

Referring to FIG. 1C and FIG. 2B, the knife holder 100 of the invention may completely accommodate the blade 120 between the first handle 110 and the second handle 130 to prevent the blade 120 from being exposed, and no additional blade sheath is needed, and the knife holder 100 of the invention has the characteristics of easy storage and small size.

More specifically, in the embodiment shown in FIG. 2B, the second end portion 122 of the blade 120 is suspended on the wrenching groove HG, and the user may move the second end portion 122 of the blade 120 in the wrenching groove HG with a finger. Therefore, the blade 120 is relatively far away from the inner side surface S1 of the first handle 110 to facilitate replacement or adjustment of the blade 120.

Figure 3:
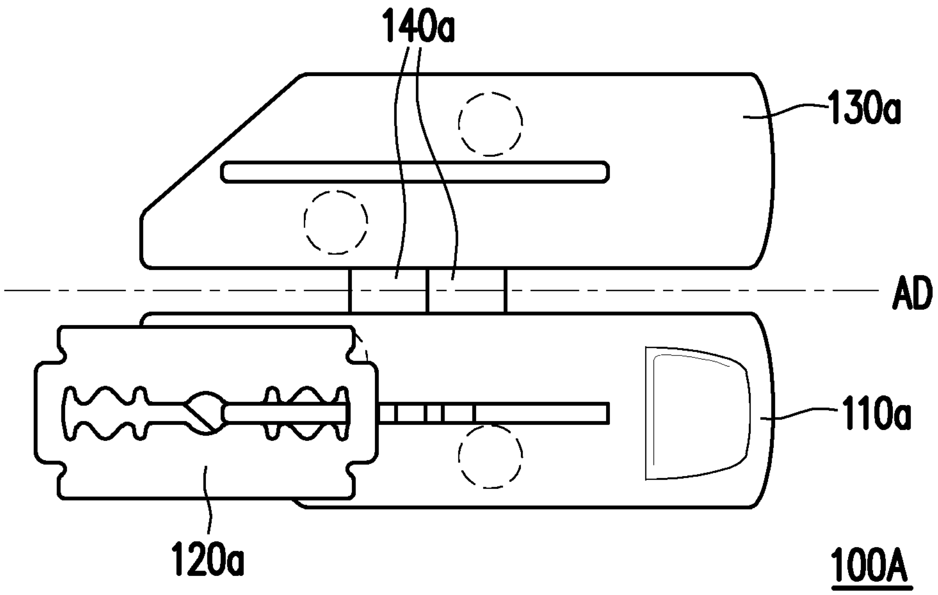
FIG. 3 is an element exploded schematic view of a knife holder according to another embodiment of the invention.

FIG. 3 is an element exploded schematic view of a knife holder according to another embodiment of the invention.

Referring to FIG. 3, a knife holder 100A of the present embodiment includes a hinge module 140*a* disposed between a first handle 110*a* and a second handle 130*a*, and the first handle 110*a* and the second handle 130*a* are adapted to be rotated along an axis AD to be expanded or closed with each other.

More specifically, the first handle 110*a* and the second handle 130*a* are pivotally connected to each other via a hinge module 140*a*, and therefore the first handle 110*a* and the second handle 130*a* are adapted for relative rotation and connecting the first handle 110*a* and the second handle 130*a* as a whole.

Figure 4:
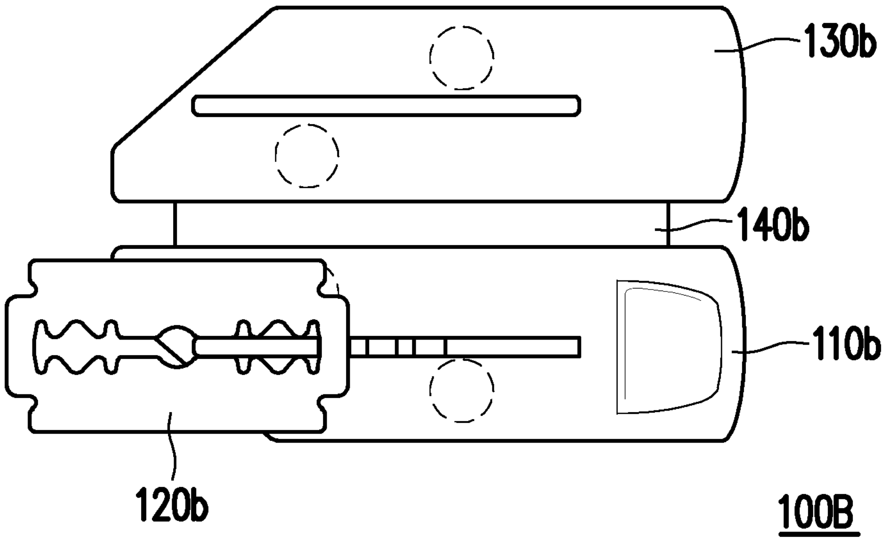
FIG. 4 is an element exploded schematic view of a knife holder according to another embodiment of the invention.

FIG. 4 is an element exploded schematic view of a knife holder according to another embodiment of the invention.

Referring to FIG. 4, a knife holder 100B of the present embodiment includes a connecting sheet 140*b* disposed between a first handle 110*b* and a second handle 130*b*, and the first handle 110*b* and the second handle 130*b* are adapted to be expanded or closed with each other via the connecting sheet 140*b*. In particular, the connecting sheet 140*b* is made of, for example, a flexible plastic material via a process such as injection molding or 3D printing.

Further, the first handle 110*b* and the second handle 130*b* are movably connected via the connecting sheet 140*b*, and the first handle 110*b* and the second handle 130*b* are connected as a whole.

Figure 5A:
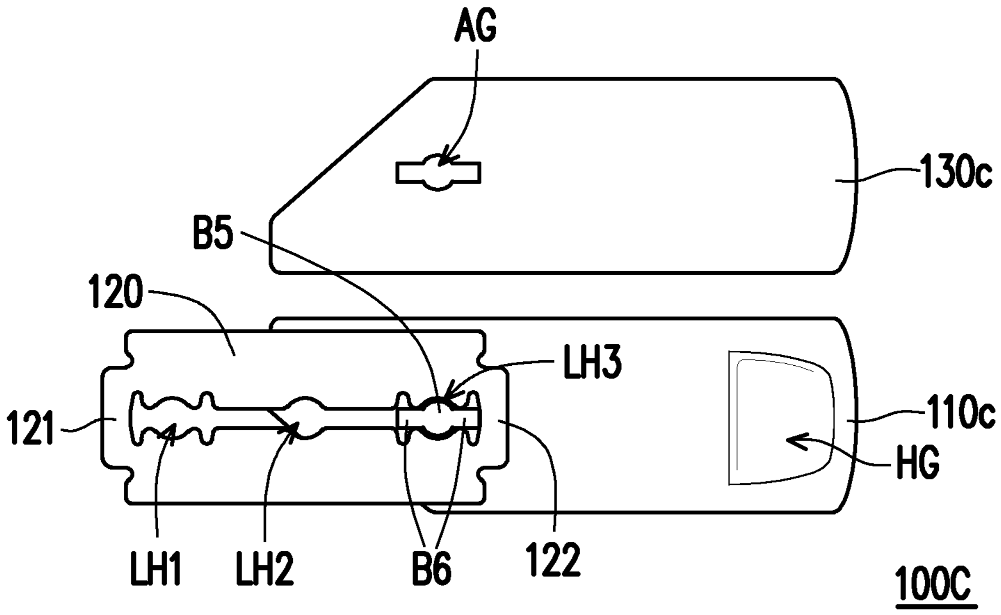
FIG. 5A is a schematic plan view of a first handle and a blade of a knife holder according to another embodiment of the invention.
Figure 5B:
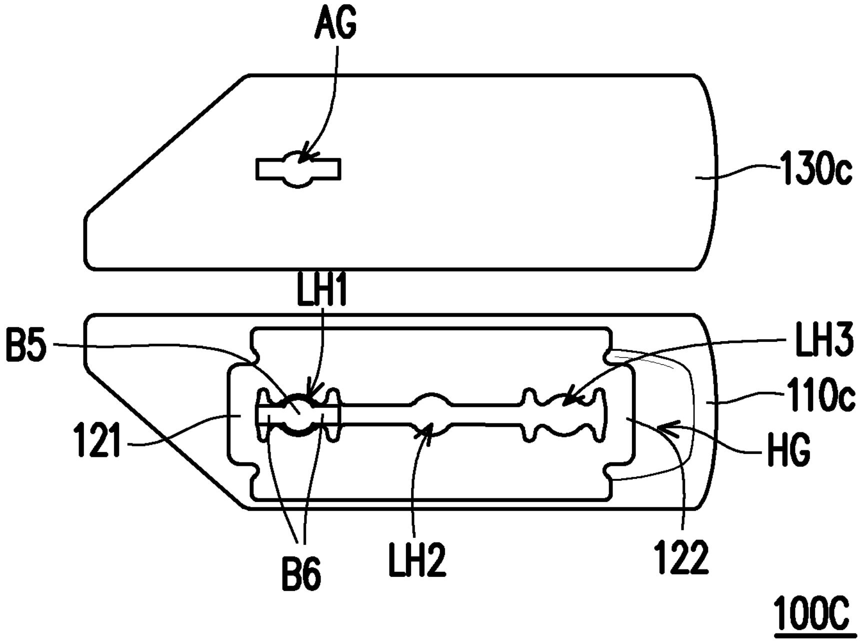
FIG. 5B is a schematic plan view of the knife holder of FIG. 5A storing a blade.

FIG. 5A is a schematic plan view of a first handle and a blade of a knife holder according to another embodiment of the invention. FIG. 5B is a schematic plan view of the knife holder of FIG. 5A storing a blade.

Referring to FIG. 5A and FIG. 5B, a knife holder 100C of the present embodiment is different from the knife holder 100 shown in FIG. 1A and FIG. 1B. The difference is that a positioning portion 111*c* of a first handle 110*c* has a positioning bump, and the positioning bump is formed by a circular portion B5 and two rectangular portions B6. The two rectangular portions B6 are respectively formed on two opposite sides of the circular portion B5 to form the accommodating groove AG of a second handle 130*c* with an irregular shape to accommodate the circular portion B5 and the two rectangular portions B6 of the positioning bump. The blade 120 has a first engaging hole LH1, a second engaging hole LH2, and a third engaging hole LH3. The blade 120 is adapted to fasten the first engaging hole LH1, the second engaging hole LH2, or the third engaging hole LH3 on the circular portion B5 and the two rectangular portions B6, and the blade 120 is clamped via the first handle 110*c* and the second handle 130*c*.

Referring to FIG. 5A, in the use state, the first end portion 121 of the blade 120 is protruded beyond the first handle

110*c* and the second handle 130*c*, and the third engaging hole LH3 accommodates the circular portion B5 and the two rectangular portions B6. More specifically, when the second engaging hole LH2 accommodates the circular portion B5 and the two rectangular portions B6, the length of the first end portion 121 of the blade 120 protruding beyond the first handle 110*c* and the second handle 130*c* is less. Referring to FIG. 5B, in the storage state, the first end portion 121 and the second end portion 122 of the blade 120 are overlapped with the first handle 110*c* and the second handle 130*c*, and the first engaging hole LH1 accommodates the circular portion B5 and the two rectangular portions B6. Further, in the use state or the storage state, the engaging holes at different positions are engaged with the circular portion B5 and the two rectangular portions B6, so as to prevent the blade 120 from shifting relative to the first handle 110*c*.

In other embodiments, the positioning bump is formed by the circular portion B5 and rectangular portions B6, which is not limited in the invention.

Figure 6:
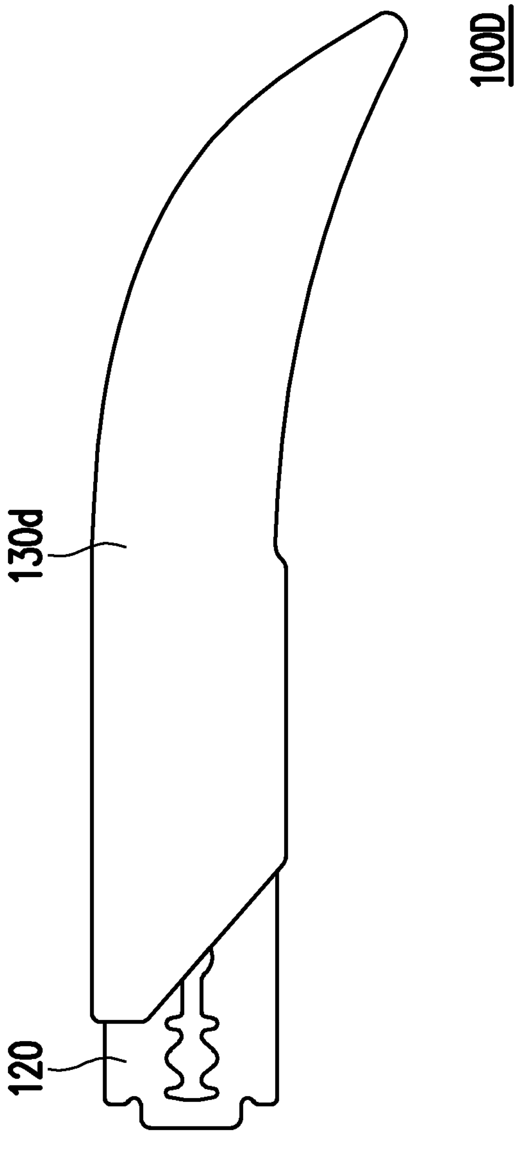
FIG. 6 is a schematic plan view of a knife holder according to another embodiment of the invention.

FIG. 6 is a schematic plan view of a knife holder according to another embodiment of the invention.

Referring to FIG. 6, a first handle and a second handle 130*d* of a knife holder 100D of the present embodiment are long structures, thus facilitating the user to hold the first handle and the second handle 130*d* with their hands to enhance the force application.

Based on the above, the knife holder of the invention is adapted to be combined with a replaceable blade and used for cutting or processing dough. In the use state, the first handle and the second handle clamp the blade and make the blade partially protrude beyond the first handle and the second handle. The user holds the first handle and the second handle and cuts with the blade. In the storage state, the blade is completely stored between the first handle and the second handle, so as to avoid the situation of exposing the blade and cutting the fingers.

Compared with the knives of the prior art, the knife holder of the invention does not have movable parts such as screws and screw caps, and therefore may avoid food safety concerns caused by other parts falling into the flour or dough during the blade adjustment process.

More specifically, the advantages and characteristics of the knife holder of the invention combined with the blade are as follows: 1. The user may cut the dough by only holding the knife holder with the thumb, middle finger, and index finger, and may also hold with the thumb, middle finger, and index finger and then bring the palm close to the knife holder to increase holding stability, thus achieving both the advantage of a round bread knife, which is light and easy to handle, adapted for precise cutting of simple-textured dough, and the advantage of a long-handled bread knife that is easier to carry and stable to hold when used to cut a large number of simple-textured dough or deeper dough. 2. The length of the blade protruding beyond the knife holder may be adjusted according to different operational requirements. 3. The knife holder of the invention has no movable parts, thus avoiding safety concerns of loose parts mixing into the flour or dough, and the blade may be loaded and unloaded without any tools and only by peeling off the knife handle. After the blade is loaded and unloaded, it is only necessary to bring the two knife handles close to each other to merge to complete the operation, and the process is convenient, fast, and safe. 4. No blade sheath is needed, and the blade may be completely stored inside the knife holder when not in use, which is convenient and safe.

What is claimed is:

1. A knife holder adapted to be connected to a blade, the knife holder comprising:

a first handle having a positioning portion formed on a first inner side surface of the first handle, and the blade is disposed on the first inner side surface of the first handle and adjustably engaged with the positioning portion; and a second handle detachably disposed on the first handle and having at least one accommodating groove formed on a second inner side surface of the second handle, the first handle and the second handle clamp the blade, and the positioning portion is accommodated in the at least one accommodating groove, wherein in a use state, the blade is partially protruded beyond the first handle and the second handle, and in a storage state, the blade is completely concealed between the first handle and the second handle, wherein the positioning portion has a first bump, a second bump, a third bump, and a fourth bump, and a first positioning groove is located between the first bump and the second bump, a second positioning groove is located between the second bump and the third bump, and a third positioning groove is located between the third bump and the fourth bump.

2. The knife holder of claim 1, wherein the at least one accommodating groove is a long groove and accommodates the first bump, the second bump, the third bump, and the fourth bump.

3. The knife holder of claim 1, wherein a number of the at least one accommodating groove comprises a plurality, and the at least one accommodating groove accommodates the first bump, the second bump, the third bump, and the fourth bump respectively.

4. The knife holder of claim 1, wherein the blade has a first end portion, a second end portion, and a long hole, and the long hole penetrates the blade and is located between the first end portion and the second end portion.

5. The knife holder of claim 4, wherein in the use state, the first end portion of the blade is protruded beyond the first handle and the second handle, the second end portion is engaged with one of the first positioning groove, the second positioning groove, and the third positioning groove, and the long hole accommodates at least the first bump, and in the storage state, the first end portion of the blade is engaged with the first positioning groove, the second end portion is located outside the fourth bump, and the long hole accommodates the second bump, the third bump, and the fourth bump.

6. The knife holder of claim 4, wherein the first handle has a wrenching groove formed on the first inner side surface, and the second end portion of the blade is suspended on the wrenching groove in the storage state.

7. The knife holder of claim 1, wherein the first handle has at least one first magnetic member, the second handle has at least one second magnetic member, and the at least one first magnetic member and the at least one second magnetic member are attracted to each other to clamp the blade.

8. The knife holder of claim 7, wherein the at least one first magnetic member is disposed on the first inner side surface, and the at least one second magnetic member is disposed on the second inner side surface and corresponds to the at least one first magnetic member.

9. The knife holder of claim 7, wherein the at least one first magnetic member is embedded in the first handle, and the at least one second magnetic member is embedded in the second handle and corresponds to the at least one first magnetic member.

10. The knife holder of claim 7, wherein the at least one first magnetic member and the at least one second magnetic member are both magnets, or one of the at least one first magnetic member and the at least one second magnetic member is a magnet and the other is a ferromagnetic metal.

11. The knife holder of claim 1, wherein the positioning portion has a positioning bump formed by a circular portion and two rectangular portions, and the two rectangular portions are respectively formed on two opposite sides of the circular portion.

12. The knife holder of claim 11, wherein the at least one accommodating groove accommodates the positioning bump.

13. The knife holder of claim 11, wherein the blade has a first end portion, a second end portion, a first engaging hole, a second engaging hole, and a third engaging hole, and the first engaging hole, the second engaging hole, and the third engaging hole penetrate the blade and are located between the first end portion and the second end portion.

14. The knife holder of claim 13, wherein in the use state, the first end portion of the blade is protruded beyond the first handle and the second handle, and the second engaging hole or the third engaging hole accommodates the positioning bump, and in the storage state, the first end portion and the second end portion of the blade are overlapped with the first handle and the second handle, and the first engaging hole accommodates the positioning bump.

15. The knife holder of claim 1, wherein the first handle and the second handle are long structures.

16. The knife holder of claim 1, further comprising a hinge module disposed between the first handle and the second handle, and the first handle and the second handle are adapted to be rotated along an axial direction to be expanded or closed with each other.

17. The knife holder of claim 1, further comprising a connecting sheet disposed between the first handle and the second handle, and the first handle and the second handle are adapted to be expanded or closed with each other via the connecting sheet.

* * * * *